(12) United States Patent
Grover

(10) Patent No.: US 8,241,400 B2
(45) Date of Patent: Aug. 14, 2012

(54) PROCESS FOR THE PRODUCTION OF CARBON DIOXIDE UTILIZING A CO-PURGE PRESSURE SWING ADSORPTION UNIT

(75) Inventor: Bhadra S. Grover, Sugar Land, TX (US)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 389 days.

(21) Appl. No.: 12/625,106

(22) Filed: Nov. 24, 2009

(65) Prior Publication Data

US 2011/0011128 A1 Jan. 20, 2011

Related U.S. Application Data

(60) Provisional application No. 61/225,668, filed on Jul. 15, 2009.

(51) Int. Cl.
*B01D 53/047* (2006.01)

(52) U.S. Cl. ............... 95/96; 95/139; 95/140; 95/143; 95/148

(58) Field of Classification Search ............... 95/90, 95, 95/117, 130, 139, 140, 143, 148; 62/617; 96/132; 423/437.1, 648.1, 230

See application file for complete search history.

(56) References Cited

U.S. PATENT DOCUMENTS

| | | | |
|---|---|---|---|
| 4,475,929 A | 10/1984 | Fuderer | |
| 4,512,780 A | 4/1985 | Fuderer | |
| 4,723,966 A | 2/1988 | Fuderer | |
| 4,726,816 A | 2/1988 | Fuderer | |
| 4,790,858 A | 12/1988 | Sircar | |
| 4,813,980 A | 3/1989 | Sircar | |
| 4,857,083 A | 8/1989 | DiMartino | |
| 4,869,894 A | 9/1989 | Wang et al. | |
| 4,963,339 A | 10/1990 | Krishnamurthy et al. | |
| 5,000,925 A | 3/1991 | Krishnamurthy et al. | |
| 5,026,406 A | 6/1991 | Kumar | |
| 5,096,470 A * | 3/1992 | Krishnamurthy | 95/102 |
| 5,133,785 A | 7/1992 | Kumar et al. | |
| 5,234,472 A * | 8/1993 | Krishnamurthy et al. | 95/98 |
| 6,503,299 B2 * | 1/2003 | Baksh et al. | 95/98 |
| 6,838,071 B1 | 1/2005 | Olsvik et al. | |
| 7,179,324 B2 * | 2/2007 | Baksh et al. | 95/100 |
| 7,699,907 B2 * | 4/2010 | Grover et al. | 95/96 |
| 2002/0073845 A1 | 6/2002 | Reddy | |
| 2004/0069143 A1 * | 4/2004 | Sumida et al. | 95/96 |
| 2008/0173584 A1 | 7/2008 | White et al. | |
| 2008/0173585 A1 | 7/2008 | White et al. | |
| 2008/0226515 A1 | 9/2008 | Allam et al. | |
| 2009/0117024 A1 | 5/2009 | Weedon et al. | |
| 2011/0011128 A1 * | 1/2011 | Grover | 62/617 |

FOREIGN PATENT DOCUMENTS

| | | |
|---|---|---|
| EP | 0341879 | 11/1989 |
| JP | 2008273802 | 11/2008 |
| WO | 2006054008 | 5/2006 |

* cited by examiner

Primary Examiner — Frank Lawrence, Jr.
(74) Attorney, Agent, or Firm — Elwood L. Haynes

(57) ABSTRACT

The present invention provides a process for recovering gaseous hydrogen and gaseous carbon dioxide from a mixture of hydrocarbons by utilizing a system that includes a reformer unit, an optional water gas shift reactor, and a pressure swing adsorption unit in conjunction with a carbon dioxide purification unit such as a cryogenic purification unit or a catalytic oxidizer. In this process, purified $CO_2$ from the $CO_2$ purification unit is used as a co-feed/co-purge in the pressure swing adsorption unit in order to produce a $CO_2$ tail gas that includes a higher concentration of $CO_2$.

52 Claims, 4 Drawing Sheets

PROCESS FOR THE PRODUCTION OF CARBON DIOXIDE UTILIZING A CO-PURGE PRESSURE SWING ADSORPTION UNIT

CROSS-REFERENCE TO RELATED APPLICATIONS

This application claims the benefit of U.S. Provisional Application No. 61/225,668, filed Jul. 15, 2009, the entire contents of which are incorporated herein by reference.

FIELD OF THE INVENTION

The present invention relates to a process for recovering gaseous hydrogen and gaseous carbon dioxide from a mixture of hydrocarbons by utilizing a system in which a purified carbon dioxide stream produced in a carbon dioxide purification unit is recycled for use as a co-feed to purge the adsorbent beds of a pressure swing adsorption unit used to treat effluent from a reformer unit/water gas shift reactor.

BACKGROUND

Interest in the recovery of carbon dioxide (hereinafter "$CO_2$") from various $CO_2$ containing gas mixtures has increased due to a variety of factors including the merchant $CO_2$ market, enhanced oil recovery and greenhouse gas emissions reduction. The currently available systems for recovering high purity $CO_2$ use a variety of generic and proprietary physical and chemical solvents such as conventional pressure swing adsorption units (hereinafter "PSA units") and CO, recovery units downstream from the PSA unit such as amine liquid wash units, Selexol liquid wash units or methanol liquid wash units. Accordingly, the processes utilized for this recovery require a large investment due to equipment costs and also high regeneration energy requirements.

Carbon dioxide containing gas mixtures are produced as waste streams during the production of hydrogen gas from hydrocarbon streams using standard steam hydrocarbon reforming processes (hereinafter "SHR"). The most preferred of the SHR processes involves the production of hydrogen gas from hydrocarbon streams using steam methane reforming (hereinafter "SMR") processes since methane has a higher proportion of hydrogen than other hydrocarbons. More specifically, with regard to general SMR processes, a hydrocarbon feed gas (natural gas) is fed into a SMR device where the methane in the feed gas reacts with steam at high temperatures (from about 700° C. to about 1100° C.) in the presence of a metal-based catalyst to produce a partially reformed gas that is a mixture of carbon monoxide and hydrogen. The hydrogen yield of this mixture is increased by passing the resulting mixture through a water gas shift reactor which promotes the conversion of carbon monoxide and water into more hydrogen. Accordingly, the result is a reformed gas stream that is rich in hydrogen but also contains to a lesser degree carbon dioxide, methane, and carbon monoxide. Such units typically operate at a temperature from about 200° C. to about 500° C. In some cases, the stream from the SHR will be at a higher temperature so optionally the stream may first be cooled with a heat exchanger before being passed through the water gas shift. In one conventional process, the reformed gas stream (the hydrogen rich stream) produced is then passed through a $H_2$ pressure swing adsorption unit (hereinafter "$H_2$ PSA unit") in order to allow for the removal of from about 80% to about 90% or more of the hydrogen present through the use of adsorbents. The removal of the hydrogen results in a waste stream (also commonly referred to as a "PSA tail gas stream") that is purged from the $H_2$ PSA unit. This PSA tail gas stream contains methane, carbon monoxide, carbon dioxide, water, and any unrecovered hydrogen. This differs from the SHR units, with the difference being that the waste stream or tail gas produced in the SHR units contains alkanes of varying size ($C_nH_{2n+2}$) and water. The desire has been to be able to utilize these waste streams more efficiently as in the past they have simply been recycled to be burned as make up fuel (added to the natural gas used in the SHR process or SMR process).

Recently, a $CO_2$ cryogenic process unit (hereinafter "CPU") process was proposed to capture the $CO_2$ during steam methane reforming $H_2$ pressure swing adsorption off gas (by Air Liquide) in WO 2006/054008. In this process, the waste gas from the CPU plant, which normally contains significant amounts of $H_2$, can be recycled back to the SMR plant for additional $H_2$ production credit. The process requires operation at high pressure and cold temperature though. Therefore, while it may be appropriate to use the $CO_2$ CPU process in a very large scale $CO_2$ recovery plant (>1000 TPD), when applying the $CO_2$ CPU process in a small size $CO_2$ recovery plant (typically 100 to 500 TPD merchant $CO_2$ plants), the energy and maintenance costs are considered to be usually high.

In an alternative conventional process, there is a $CO_2$ recovery unit downstream of the $H_2$ PSA. This $CO_2$ recovery unit can be a liquid wash unit such as an amine liquid wash unit, a Selexol liquid wash unit or a methanol liquid wash unit or a cryogenic unit. In this schematic, the $H_2$ PSA tail gas is optionally compressed upstream of the $CO_2$ recovery unit. The tail gas after $CO_2$ recovery is then recycled to the PSA unit, recycled as the SMR feed or used as fuel in the SMR furnace. By recycling the tail gas, $H_2$ recovery is increased.

Even with the above conventional methods, there exists a need to provide a process that allows for a more economical recovery of highly concentrated $CO_2$ from a pressure swing adsorption process without effecting hydrogen recovery.

SUMMARY OF THE INVENTION

The present invention relates to a process for recovering gaseous hydrogen and gaseous carbon dioxide from a mixture of hydrocarbons by utilizing a system that comprises a reformer unit, an optional water gas shift reactor, and a pressure swing adsorption unit in conjunction with a carbon dioxide purification unit (such as a cryogenic purification unit or a catalytic oxidizer unit) in which purified carbon dioxide from the carbon dioxide purification unit is used as a co-feed to purge the adsorbent beds in the pressure swing adsorption unit.

DETAILED DESCRIPTION OF THE INVENTION

By using the purified $CO_2$ from a purification unit such as a CPU or a catalytic oxidizer unit (hereinafter "CatOx unit") to serve as a co-purge (co-feed) for the adsorbent beds in a $H_2$ PSA unit after the adsorption step of the $H_2$ PSA cycle, it is possible to increase the concentration of the $CO_2$ in the $CO_2$ rich tail gas coming from the $H_2$ PSA unit thereby providing a process and system which not only results in the production of a high purity hydrogen (hereinafter "$H_2$") gas but also a highly concentrated $CO_2$ gas while at the same time reducing the costs for the production of the same due to less downstream treatment (purification) being required.

In the process of the present invention, it is possible to recover gaseous $H_2$ and gaseous $CO_2$ from a mixture of hydrocarbons utilizing a reformer unit in conjunction with an optional water gas shift reactor (hereinafter "WGS reactor"), a co-purge $H_2$ PSA unit and $CO_2$ purification unit (such as a CPU or CatOx unit). This is achieved by utilizing the purified $CO_2$ product from the $CO_2$ purification unit as a co-feed or co-purge in the $H_2$ PSA process. The proposed processes of the present invention include a variety of embodiments for achieving this result, some of which include: 1) the use of a SHR unit, a WGS reactor, a co-purge $H_2$ PSA unit and a CPU or 2) the use of a oxygen fed autothermal reformer (hereinafter "ATR") unit, a WGS reactor, a co-purge $H_2$ PSA unit and a CPU or 3) the use of a SHR unit, a WGS reactor, a co-purge $H_2$ PSA unit and a CatOx unit or 4) the use of an ATR unit, a WGS unit, a co-purge $H_2$ PSA unit and a CatOx unit, in order to increase the concentration of the $CO_2$ in the tail gas stream produced from the $H_2$ PSA unit and accordingly provide for additional use of the $CO_2$ that would normally be used for other purposes such as makeup fuel in the reformer unit.

The overall processes of the present invention involve recovering high purity gaseous hydrogen and highly concentrated gaseous $CO_2$. As used herein, the phrase "highly concentrated gaseous $CO_2$" refers to the tail gas stream that is the product of the process of the present invention in which a $CO_2$ stream from the $CO_2$ purification unit is used as a co-feed to purge the adsorbents beds of a $H_2$ PSA unit, said highly concentrated gaseous $CO_2$ having a $CO_2$ content that is greater than about 75 mol % carbon dioxide, preferably from about 85 mol % carbon dioxide to about 99 mol % carbon dioxide.

Figure 1:
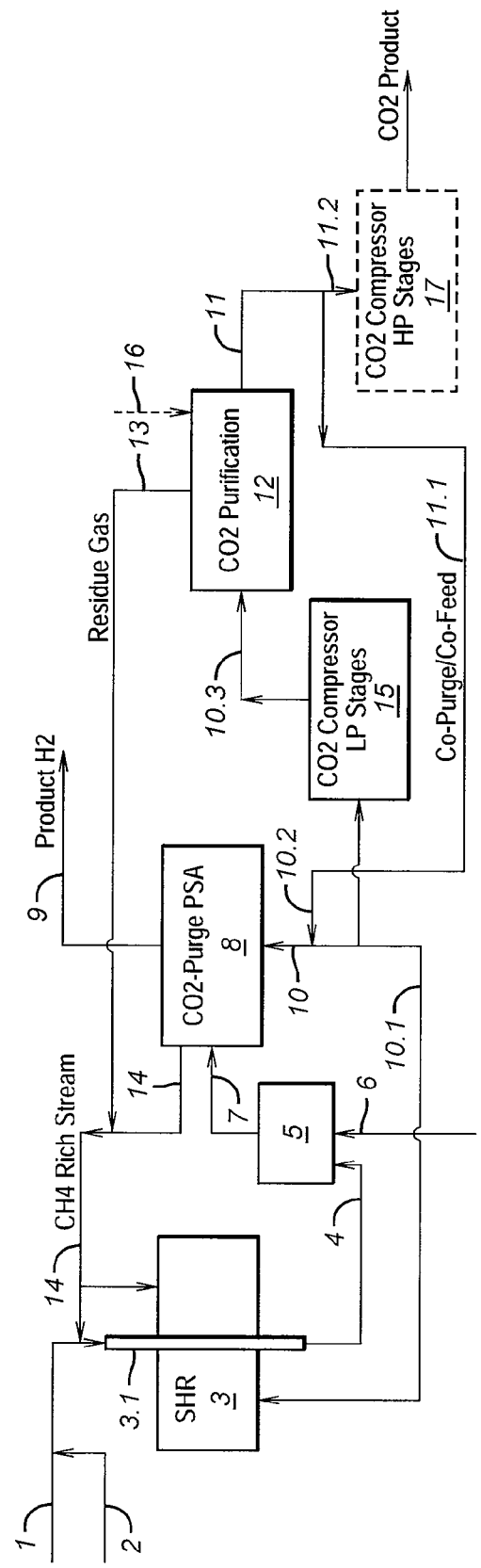
FIG. 1 provides a schematic of the present invention which includes a SHR unit.
Figure 2:
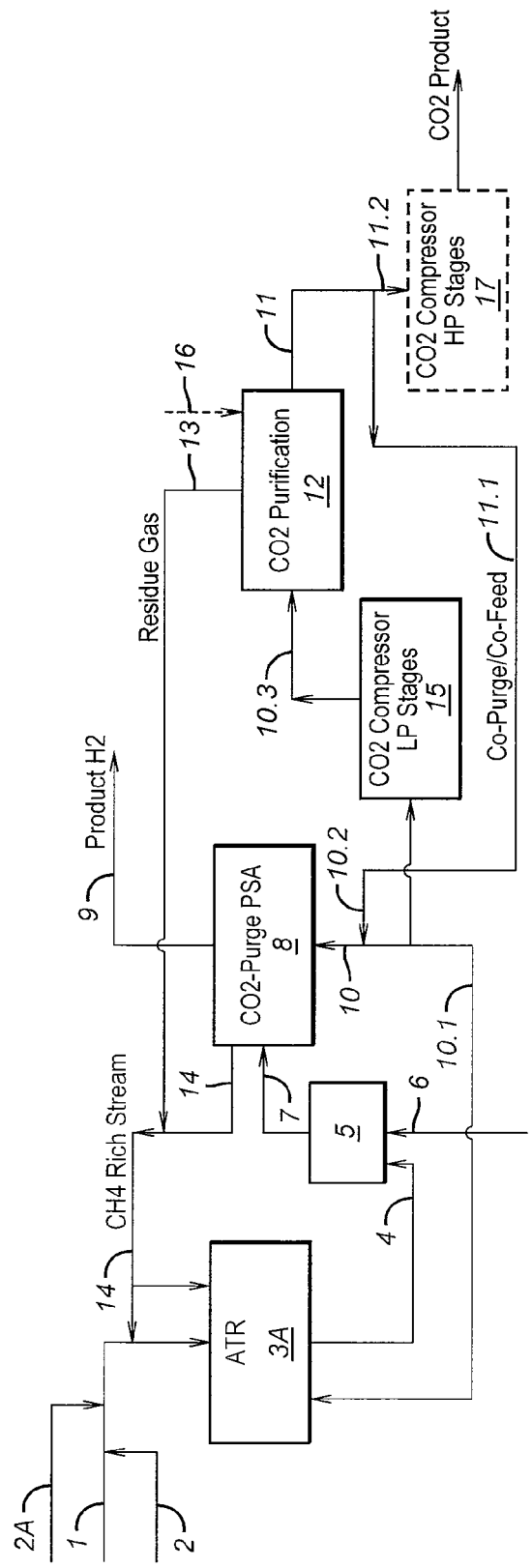
FIG. 2 provides an alternative schematic of the present invention which includes an ATR unit.

The first stages of this process, as shown in FIGS. 1 and 2, involve the generation of a hydrogen rich effluent stream by the treatment of one or more hydrocarbon streams (also referred to as one or more hydrocarbon feed gases) provided via line 1 in a reformer unit 3 (3A in FIG. 2). As used herein, the phrase "reformer unit" is meant to encompass those processes which are utilized to produce a synthesis gas. In the preferred embodiments of the present invention, the reformer unit 3 will be selected from a SHR unit 3 as depicted in FIG. 1 and an oxygen fed ATR unit 3A as depicted in FIG. 2.

In the first embodiment as shown in FIG. 1, the SHR unit 3 is used. The present invention is not meant to be limited by the SHR unit 3 or the process for carrying out the reaction in the SHR unit 3. Accordingly, any SHR unit 3 known in the art may be used in the process of the present invention. By way of general description, such SHR units 3 typically contain tubes 3.1 (only one shown in FIG. 1) packed with a SHR catalyst (typically a nickel catalyst) through which the steam 2/hydrocarbon stream 1 mixture passes. As used throughout with regard to the present invention, the phrase "steam hydrocarbon reformer unit" or "SHR unit" refers not only to the actual reformer units, but also to all of the additional components (not shown) that typically are considered to make up a steam hydrocarbon reformer, including, but not limited to, one or more components selected from heat exchangers, pre-reformer units, the reformer, tubes with one or more types of catalyst, etc. The reaction product from the steam hydrocarbon reformer unit (hereinafter "SHR product stream") is principally a hydrogen rich effluent that contains $H_2$, carbon monoxide (hereinafter "CO"), methane (hereinafter "$CH_4$"), water vapor and $CO_2$ in proportions close to equilibrium amounts at the elevated temperature and pressure. When the SHR unit is utilized, it is preferably a SMR unit.

With regard to this first embodiment, in certain situations, especially where there is no need to have CO as a product, the scheme may optionally contain a WGS reactor 5 which functions to react CO and water to form $H_2$ and $CO_2$ and obtain a WGS effluent. In the preferred embodiment where the WGS reactor 5 is included, the SHR product stream is introduced via line 4 into a WGS reactor 5 (which can contain a variety of stages or one stage; stages not shown) along with steam which is introduced via line 6 to form additional $H_2$ and $CO_2$. The combination of a SHR unit 3 and a WGS reactor 5 is well known to those skilled in the art.

In an alternative embodiment of the present invention as shown in FIG. 2, the reformer unit will be an oxygen fed ATR unit 3A. With regard to the ATR unit 3A, combustion of the one or more hydrocarbon streams provided via line 1 is carried out with steam provided via line 2 and substoichiometric amounts of oxygen provided via line 2A by flame reactions in a burner combustion zone and, subsequently, autothermal reforming of the partially combusted feedstock. The present invention is not meant to be limited by the ATR unit 3A or the process for carrying out the reaction in the ATR unit 3A. Accordingly, any ATR unit 3A known in the art may be used in the process of the present invention. In addition, as used herein, the phrase "autothermal reformer unit" or "ATR unit" refers not only to the actual reformer units, but also to all of the additional components (not shown) that typically are considered to make up an ATR unit, including, but not limited to, one or more components selected from heat exchangers, pre-reformer units, the reformer, beds with one or more types of catalyst, etc.

As with the SHR unit, in certain situations when there is no need to have CO as a product, the scheme may optionally include a WGS reactor 5 which functions to react CO and water to form additional $H_2$ and $CO_2$ by further reacting or treating the hydrogen rich effluent provided to the WGS reactor 5 via line 4 from the ATR unit 3A with steam supplied via line 6 in order to obtain a WGS effluent. The combination of an ATR unit 3A and a WGS reactor 5 is known to those skilled in the art.

With regard to each of the embodiments discussed above, a $H_2$ rich effluent is produced in the corresponding reformer unit 3, 3A that contains in addition to $H_2$, other components such as CO, $CO_2$, $CH_4$ and water vapor. Preferably, this $H_2$ rich effluent is optionally further treated in the WGS reactor 5 in order to further enrich the $H_2$ content of the $H_2$ rich effluent and to also increase the $CO_2$ content in the $H_2$ rich effluent by oxidizing a portion of the CO present in the effluent to $CO_2$ thereby obtaining a WGS effluent. For purposes of the present discussion, reference will be made to those embodiments which include the WGS reactor 5. However, those skilled in the art will recognize that the effluent to be introduced into the $H_2$ PSA unit 8 may simply be taken from the reformer unit without passing through a WGS reactor 5. Both embodiments are considered to be within the scope of the present invention.

With regard to each of these embodiments, once the WGS effluent is obtained, this effluent is introduced into a co-purge $H_2$ PSA unit 8 via line 7 in order to produce high purity $H_2$.

Figure 3:
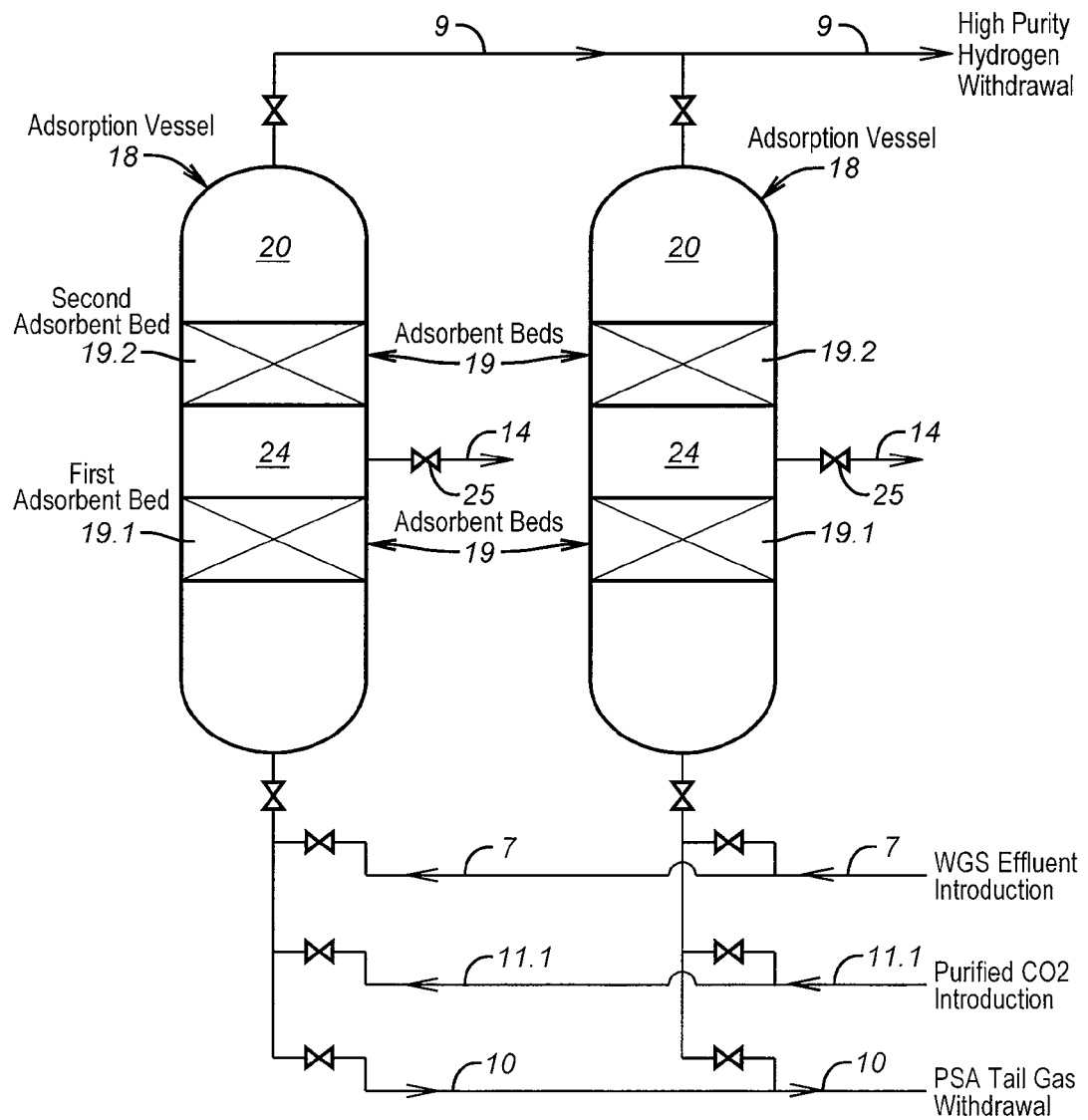
FIG. 3 provides a schematic of two adsorption vessels from a hydrogen pressure swing adsorption unit with each adsorption vessel having two adsorbent beds within one interior area, wherein within each of the adsorption vessels, the adsorbent beds are separated by an intermediate draw area.
Figure 4:
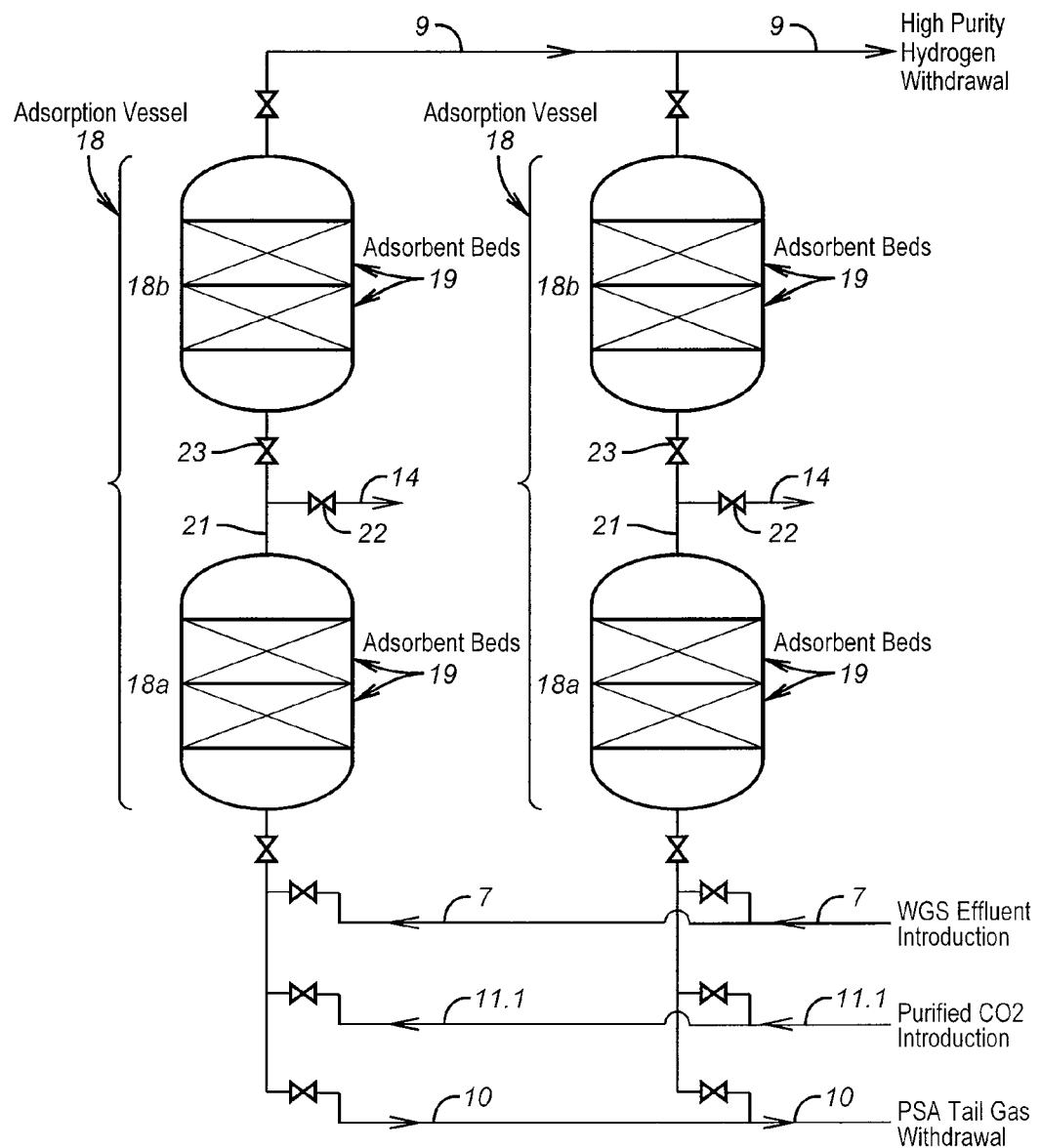
FIG. 4 provides a schematic of two parallel adsorption vessels from a hydrogen pressure swing adsorption unit, each of the adsorption vessels having two separated sections separated by a pipe with each section having two adsorbent beds.

Prior to introduction into the co-purge $H_2$ PSA unit 8, if necessary, the WGS effluent will typically be cooled down to less than about 50° C. and to a pressure that allows for the adsorption step of the $H_2$ PSA cycle to be run at a pressure from about 250 psig to about 700 psig. The cooling down step is typically accomplished via a heat exchanger (not shown). Typically the $H_2$ rich effluent and the WGS effluent utilized are at pressure or may be pressurized via a compressor (not shown). As used herein, the phrase "co-purge $H_2$PSA unit" or "co-feed $H_2$ PSA unit" refers to a conventional $H_2$ PSA unit which allows for the introduction of an additional gas stream (co-purge or co-feed stream) during the purge step of the $H_2$ PSA cycle. The $H_2$ PSA unit 8 utilized can be any $H_2$ PSA unit known in the art that comprises two or more adsorption vessels 18 as shown in FIGS. 3 to 4, each of the adsorption vessels 18 independently having anywhere from two to six adsorbent beds 19 although more than six adsorbent beds may be utilized. Typically, the $H_2$ PSA unit 8 will have anywhere from two to sixteen, preferably from four to sixteen, adsorption vessels 18 that are parallel with regard to one another. The actual number of adsorption vessels 18 present will typically depend upon the size of the facility where the $H_2$ PSA unit 8 is located and the quantity of gas to be treated. Each of the adsorption vessels 18 will typically contain multiple adsorbent beds 19 which are also parallel to one another and in certain embodiments; two or more of the multiple adsorbent beds 19 may be adjacent to one another. A variety of configurations with regard to the adsorption vessels 18 and the adsorbent beds 19 as shown in FIGS. 3 to 4 may be utilized in the present invention.

During the process of $H_2$ production, each of the adsorption vessels 18 will individually undergo a cycle that includes an adsorption step, a co-feed step, a depressurization step, a regeneration step, and a re-pressurization step. With regard to the adsorption vessels 18 of the $H_2$ PSA units 8 that are in use at the same time, the cycles in these various adsorption vessels 18 will run consecutively. However, while the cycles run consecutively, they do not all run such that each of the adsorption vessels 18 is within the same cycle step at the same time. Instead, at least one of the adsorption vessels 18 of the total number of adsorption vessels 18 being utilized within the co-purge $H_2$ PSA unit 8 will be in a different step of the cycle when compared to the step of at least one of the remaining adsorption vessels 18 that is being utilized (the cycles are staggered with regard to at least two of the adsorption vessels 18).

As noted above, the actual adsorption vessels 18 and adsorbent beds 19 can take on a variety of different configurations as shown in FIGS. 3 to 4. In one such configuration as shown in FIG. 3, the co-purge $H_2$ PSA unit 8 has two or more adsorption vessels 18 that are parallel to one another (note only two adsorption vessels are depicted in FIG. 3). Each adsorption vessel 18 comprises one internal space 20 into which multiple adsorbent beds 19 are placed (in this schematic two adsorbent beds 19).

During the co-purge step of the $H_2$ PSA cycle, a purified $CO_2$ stream is fed into the adsorption vessel 18 and consequently the adsorbent beds 19 via line 11.1. As the purified $CO_2$ stream enters the adsorbent beds 19 of the adsorption vessel 18, the $CO_2$ from the purified $CO_2$ stream begins to displace the components (such as $CH_4$ and CO) that adhered to the adsorbents of the adsorbent beds 19 during the adsorption step of the $H_2$ PSA cycle (when the WGS effluent stream was brought into contact with the adsorbent beds 19). As a result, within this particular step of the $H_2$ PSA cycle (the co-purge step), a $CH_4$ rich stream is formed from the components that are displaced by the $CO_2$. As a result, this $CH_4$ rich stream is withdrawn from the intermediate draw area 24 with the aid of a valve 25 that is associated with line 14. This allows for the withdrawal of a stream from the first adsorbent bed 19.1 during the co-purge step of the $H_2$ PSA cycle before the stream goes though the second adsorbent bed 19.2. Furthermore, with regard to this particular alternative, the adsorbent beds 19 may still be considered to be "stacked" in that one of the adsorbent beds 19.2 is considered in an upper position in relation to the other adsorbent bed 19.1 which would then be considered to be in a lower position in relation to the first adsorbent bed 19.2. Accordingly, in this particular alternative, in the $H_2$ PSA cycle, the adsorbent beds are in full communication with one another. Note that the $CH_4$ rich stream that is withdrawn can be recycled to the hydrocarbon feed stream 1 to supplement the hydrocarbon feed or can be directly injected into the reformer unit (see FIGS. 1 and 2).

As noted in FIG. 3, the adsorbent beds 19 are arranged within an adsorption vessel 18 such that they are separated from one another by the intermediate draw area 24. Accordingly, as shown in FIG. 3, in the co-purge $H_2$ PSA unit 8, an actual space (intermediate draw area 24) in which there is no adsorbent beds 19 present extends between the two adsorbent beds 19 that are present in that particular adsorption vessel 18. In this alternative, only two adsorbents beds 19 are shown within each adsorption vessel 18. While this embodiment is referenced with regard to two adsorbent beds 19, those skilled in the art will recognize that this embodiment may be carried out with regard to any number of adsorbent beds 19. Accordingly, with regard to an adsorption vessel 18 having greater than two adsorbent beds 19, it is still possible to withdraw a stream from the area between any two adsorbent beds 19 using a valve 25 located along line 14 which extends from the intermediate draw area 24. More specifically, in the case where there are more than two adsorbent beds 19 present, there may be an intermediate draw area 24 present between each pair of adsorbent beds 19; between only one pair of adsorbent beds 19 with the remaining adsorbent beds 19 being adjacent to one another, or multiple intermediate draw areas 24 dispersed among the multiple adsorbent beds 19 with there being some adsorbent beds 19 that are adjacent to one another and others that are separated by an intermediate draw area 24.

With regard to the adsorbent beds 19 of FIG. 3, it would be possible to have different adsorbents in the one or more adsorbent beds 19. For example, the first adsorbent bed 19.1 (or adsorbent beds 19 when more than one adsorbent bed 19 is present on one side of the intermediate draw area 24) can include one or more adsorbents that are selective for the removal of $CH_4$, CO, and nitrogen (hereinafter "$N_2$") while the second adsorbent bed 19.2 (or adsorbent beds 19 when more than one adsorbent bed 19 is present on the other side of the intermediate draw area 24) can contain one or more adsorbent beds 19 that each contain one or more adsorbents that allow for the removal of $CO_2$ (one or more adsorbents that are selective for this component).

In another configuration as shown in FIG. 4, the $H_2$ PSA unit 8 has two or more adsorption vessels 18 that are parallel to one another with each of these adsorption vessels 18 containing two or more adsorbent beds 19. Unlike the previous embodiment set forth in FIG. 3 where the adsorbent beds 19 are stacked in relation to one another, and are separated by an intermediate draw area 24 but are still all contained within the same interior space 20 of the adsorption vessel 18 of the $H_2$ PSA unit 8, in this alternative embodiment, the adsorption vessel 18 comprises a split adsorption vessel 18 (two or more separated sections in series 18a and 18b) wherein each section 18a, 18b of the adsorption vessel 18 includes one or more adsorbent beds 19. The manner in which the adsorption vessel 18 is split is to allow the sections 18a, 18b to be partitioned from one another to optionally limit the flow of any gas introduced into the one or more adsorbent beds 19 of one section 18b of the adsorption vessel 18 with regard to the one or more of the adsorbent beds 19 of the other section 18a of the adsorption vessel 18. In other words, the adsorbent beds 19 of the various sections in essence function as separate entities with regard to one another by residing in separated sections 18a, 18b within the same general adsorption vessel 18. Accordingly, as shown in FIG. 4, in the co-purge $H_2$ PSA unit 8, a pipe 21 is present that extends between the two adsorption sections 18a, 18b and serves to "connect" the adsorption sections 18a, 18b for the purpose of flow between the two separate individually contained adsorption sections 18a, 18b. This pipe 21 allows for the isolation or separation of the adsorption sections 18a, 18b with regard to one another. This pipe 21, through the use of a withdrawal valve 22 located on line 14, in turn also allows for the withdrawal of a $CH_4$ rich stream between the two adsorption vessel sections 18a, 18b during the co-purge step of the $H_2$ PSA cycle. In essence, this pipe 21 functions much in much the same manner as the intermediate draw area of FIG. 3 but with more control over the flow between the two adsorption sections 18a, 18b (two adsorbent beds 19 in FIG. 3). Furthermore, with regard to this particular alternative embodiment, the adsorbent beds 19 of the adsorption vessel sections 18a, 18b may still be considered to be "stacked" in that one of the adsorption vessel sections 18b is considered in an upper position in relation to the other adsorption vessel section 18a which would then be considered to be in a lower position in relation to the other adsorption vessel section 18b. With this configuration of an upper and lower position, the adsorbent beds 19 are also considered to be in a stacked position with regard to one another as the one or more adsorbent beds 19 of the upper adsorption vessel section 18b are now considered to be in the upper position with regard to the one or more adsorbent beds 19 of the lower adsorption vessel section 18a.

While in some PSA cycle steps it may be desirable to run the $H_2$ PSA cycle with the pipe 21 fully communicating between the two adsorption vessel sections 18a, 18b, in other instances, it would be desirable to have a means for isolating or separating 23 (closing off the communication) one adsorption vessel section 18a with regard to the other adsorption vessel section 18b. In such an instance, it would be possible to have different adsorbents in the one or more adsorbent beds 19 of the different adsorption vessel sections 18a, 18b. For example, the lower adsorption vessel section 18a can contain one or more adsorbent beds 19 that each include one or more adsorbents that are selective for $CO_2$ while the upper adsorption vessel section 18b can contain one or more adsorbent beds 19 that each contain one or more adsorbents that allow for the removal of $CH_4$, CO, and nitrogen (hereinafter "$N_2$") (one or more adsorbents that are selective for these components). Accordingly, with such a pipe 21 in place that connects the two adsorption vessel sections 18a, 18b and a means for isolating or separating 23 the two adsorption vessel sections 18a, 18b from one another during the depressurization step of the $H_2$ PSA cycle, it would be possible to prevent the $CH_4$, CO and $N_2$ adsorbed to the adsorbent in the upper adsorption vessel section 18b from mixing with the $CO_2$ adsorbed to the adsorbent of the lower adsorption vessel section 18a or the $CO_2$ from flowing up into the upper adsorption vessel section 18b. In a still further alternative, each of the adsorption vessel sections 18a, 18b that are separated from one another may have greater than one adsorbent bed 19 within that particular section 18a, 18b with each of the adsorbent beds 19 containing a different adsorbent from the other adsorbent bed 19 contained in that particular section 18a, 18b. The means for isolating or separating 23 the two adsorption vessel sections 18a, 18b will typically comprise one or more valves 23 located along the pipe 21 that connects the two adsorption vessel sections 18a, 18b. The $CH_4$ stream withdrawn during the co-purge step can be withdrawn via line 14 through the use of valve 22 and recycled to line 1 for use to supplement the hydrocarbon feed stream.

An even further alternative to FIG. 4 is possible in that the two or more beds in the various individual sections 18a or 18b of the adsorption vessel 18 may be separated from one another by an intermediate draw area 24 as shown within FIG. 3.

With regard to the various embodiments of the present invention, preferably at least two types of adsorbents are used in the adsorbent beds 19 of the co-purge $H_2$ PSA unit 8. These adsorbents include, but are not limited to, activated alumina, silica gel, activated carbon, zeolites, and combinations thereof. In one preferred embodiment of the present invention, the co-purge H, PSA unit 8 comprises multiple adsorbent beds 19 (most preferably two to four) that are stacked in relation to one another and in which different adsorbents are used. Accordingly, for example as shown in FIG. 3, in the embodiment where there are two adsorbent beds 19, one adsorbent bed 19 may be referred to as the first adsorbent bed 19.1 and contain one or more adsorbents that are selective for $CH_4$ and CO, while the other adsorbent bed 19 may be referred to as the second adsorbent bed 19.2 and contain one or more adsorbents that are selective for $CO_2$ and water vapor. In a still further embodiment, the adsorption vessel 18 can comprise a split adsorption vessel as shown in FIG. 4, for example, a split adsorption vessel having a first section 18a and a second section 18b, wherein the first section 18a contains two or more adsorbent beds 19, each bed 19 containing one or more adsorbents that are selective for $CH_4$ and CO, and the second section 18b containing two or more adsorbent beds 19, each adsorbents selective for $CO_2$ and water vapor.

As a result of the co-purge $H_2$ PSA cycle within the adsorption vessel 18, as shown in FIGS. 1 and 2, three separate gas streams are obtained as a result of the co-purge $H_2$ PSA process. More specifically, in the embodiments depicted in FIGS. 3 and 4 where the adsorbent beds 19 are separated due to the adsorbent beds 19 being divided into sections 18a, 18b or due to an intermediate draw area 24 being positioned between the adsorbent beds 19, three separate gas streams are obtained: one that is a gaseous high purity $H_2$ stream that is withdrawn via line 9, a PSA tail gas which is rich in $CO_2$ and is withdrawn via line 10 after desorption of the two or more adsorbent beds 19 in the various adsorption vessels 18 and a $CH_4$ rich stream that is withdrawn via line 14.

With regard to the PSA tail gas, a portion of this gas stream may be passed back to the CO, purification unit 12 via line 10.2 and line 10.3 or it may be passed back to the SHR unit 3 as shown in FIG. 1 (or to the ATR unit 3A as shown in FIG. 2) via line 10.1. The $CH_4$ rich stream 14 is recycled back to the SHR or the ATR. In the cycle, the WGS effluent is introduced into the $H_2$ PSA vessel via line 7 where it then flows over the adsorbent beds 19 (not shown). The $H_2$ contained in the WGS effluent (which is also a rich effluent) passes over the adsorbents and is capable of being withdrawn via line 9 during the adsorption step of the $H_2$ PSA cycle where it is passed on for further use as $H_2$ product. The other components from the WGS effluent make up the $CH_4$ rich stream and PSA tail gas and are adsorbed to the adsorbents of the adsorbent beds 19 during the adsorption step of the $H_2$ PSA cycle. Accordingly, these components are still within the adsorbent beds 19 of the $H_2$ PSA adsorption vessel 18 once the introduction of the WGS effluent flow is stopped. The $H_2$ PSA cycle is carried out using conventional parameters. With regard to the present embodiments, the pressure during the adsorption steps will generally range from about 250 psig to about 700 psig.

As noted, the $H_2$ PSA cycle of the present process also includes a co-purge (co-feed) step in which a $CO_2$ stream is used to aid in purging the adsorbent beds 19. The purpose of this co-purge step is to provide an economically efficient manner to increase the concentration of the $CO_2$ in the $H_2$ PSA tail gas. According to the present processes as noted above, after the adsorption step, the injection of the WSG effluent is stopped and a purified $CO_2$ stream that is obtained from the $CO_2$ purification unit 12 via line 11 downstream from the $H_2$ PSA unit 8 is then injected via lines 11.1 and 10 into the adsorption vessel 18 of the $H_2$ PSA unit 8 which is in the co-purge step of the $H_2$ PSA cycle and allowed to pass over the adsorbent beds 19. In the preferred embodiment, the purified $CO_2$ stream is introduced into the co-purge step of the $H_2$ PSA cycle at a pressure that is higher than the pressure during the adsorption step of the $H_2$ PSA cycle. Preferably, the pressure during the co-purge step of the $H_2$ PSA cycle is in the range of from about 300 psig to about 800 psig. An optional $CO_2$ compressor 15 having multiple compression stages may be used to achieve this range if necessary.

As noted, the purified $CO_2$ stream is obtained from a $CO_2$ purification unit 12 via line 11. In one embodiment of the present invention, the $CO_2$ purification unit 12 is a CPU unit (specifics not shown). In an alternative embodiment, the $CO_2$ purification unit is a CatOx unit (specifics not shown). Due to the degree of affinity of the various components in the WGS effluent for the adsorbents in the adsorbent beds 19 of the $H_2$ PSA unit 8, the $CO_2$ that is injected from the purified $CO_2$ stream (the co-purge) begins to displace the $CH_4$ and CO that is adsorbed on the adsorbents in the adsorbent beds 19 during the adsorption step of the $H_2$ PSA cycle. The result of this is the displacement of these other components ($CH_4$ and CO) by $CO_2$ on the adsorbents. Consequently, there is a larger concentration of $CO_2$ that is adsorbed on the adsorbents. $CH_4$ and CO displaced from the adsorbent and void spaces in the adsorbent is removed as a gas stream that is $CH_4$ rich but also contains amounts of CO and $H_2$. As the purified $CO_2$ stream is injected into the $H_2$ PSA vessel 8, it is also possible to remove the resulting $CH_4$ rich stream from the $H_2$ PSA vessel via line 14. The $CH_4$ rich stream can be recycled to the reformer feed 1, injected directly into the SHR unit 3 (or in the second embodiment the ATR unit 3A), or used in any other manner known in the art for the use of such streams.

With further reference to various Figures, the PSA tail gas is withdrawn from the adsorbent beds 19 of the adsorption vessels 18 of the $H_2$ PSA unit 8 via line 10 during the depressurization step of the $H_2$ PSA cycle. By depressurizing the adsorbent beds 19 of the at least one $H_2$ PSA adsorption vessel 18, it is possible to release the $CO_2$, and CO, $CH_4$, water vapor and remaining $H_2$ adsorbed to or on the adsorbents, or held in the void spaces in the adsorbent, and produce a $CO_2$ rich pressure swing adsorption tail gas during the depressurization step of the $H_2$ PSA cycle. The $CO_2$ recovered during the depressurization step can be collected at two or more different pressure levels. In one embodiment, the suction pressure of the various stages of the $CO_2$ compressors 15 are the same as the pressure levels in the depressurization step of the $H_2$ PSA cycle. Once the adsorbent beds 19 are depressurized and the $CO_2$ rich PSA tail gas is withdrawn via line 10, the adsorbent beds 19 of the adsorption vessel 18 may be further regenerated and repressurized utilizing procedures that are readily known in the art.

Once the $CO_2$ rich $H_2$ PSA tail gas is withdrawn from the $H_2$ PSA unit 8 via line 10, the $CO_2$ rich PSA tail gas can optionally be compressed in a compressor unit 15 having various pressure stages to a pressure that ranges from about 250 psig to about 1000 psig in order to obtain a compressed $CO_2$ rich $H_2$ PSA tail gas. Compressor units 15 such as the one utilized in the present invention are know by those skilled in the art and include compressor units 15 that have a variety of compression stages thereby allowing for staged compression. After the $CO_2$ rich $H_2$ PSA tail gas is compressed to the desired level, the compressed $CO_2$ rich $H_2$ PSA tail gas is then introduced into a $CO_2$ purification unit via line 10.3 that is either a CPU (a cryogenic purification unit) such as those known in the art or a CatOx unit such as those known in the art.

In the embodiment that utilizes the CPU, the $CO_2$ in the compressed $CO_2$ rich $H_2$ PSA tail gas is condensed at a temperature between ambient temperature and $-56°$ C. to provide a liquid stream and a gas stream. The condensation may be in one stage or in various stages. Such cryogenic purification units and associated processes are readily known to those skilled in the art. As a result of this condensation, the $CO_2$ liquefies and the remaining components (the incondensibles) remain in a gaseous state. The incondensibles stream typically contains $CH_4$, CO, and $H_2$. Following the condensing step, the liquid $CO_2$ stream is separated from the incondensibles stream. The liquid $CO_2$ is vaporized to recover refrigeration, and optionally compressed further to 2000 psig in CO2 Compressor HP Stages 17. The incondensibles stream is then passed along for further use according to the prior art.

As noted above, at least a portion of the $CO_2$ produced will be recycled via line 11.1 for use in the $H_2$ PSA unit 8 as a co-purge (co-feed) during the co-purge step of the $H_2$ PSA cycle. The remaining portion of the $CO_2$ produced may be withdrawn via line 11.2 and used according to the various uses known in the art. When the purified $CO_2$ stream is recycled to the $H_2$ PSA unit 8, the purified $CO_2$ stream will be introduced into the $H_2$ PSA adsorption vessel and allowed to pass over the various adsorbent beds during the co-purge step in order to increase the concentration of $CO_2$ in the $H_2$ PSA tail gas.

In the alternative embodiment, the $CO_2$ purification unit 12 is a catalytic oxidation (CatOx) unit which functions to burn off the light ends (the $CH_4$ and CO) thereby leaving a stream that contains basically $CO_2$ and water. In this embodiment, after the $CO_2$ rich $H_2$ PSA tail gas is compressed in the compressor unit 15, the compressed $CO_2$ rich $H_2$ PSA tail gas is introduced into a CatOx unit such as those that are known in the art. Following the introduction of the $CO_2$ rich $H_2$ PSA tail gas, gaseous oxygen (hereinafter "$O_2$") is then introduced into the CatOx unit via line 16. With the aid of a combustion catalyst, the CO, $CH_4$, and $H_2$ that is present in the $CO_2$ rich H, PSA tail gas is combusted to produce an oxidized stream that contains $CO_2$ and water. The amount of $O_2$ utilized in the process will typically be slightly below the stoichiometric requirement. Once the combustion takes place, the resulting oxidized stream of $CO_2$ and water is condensed in order to allow for the removal of water by cooling the oxidized stream to ambient temperature to produce a purified $CO_2$ stream. This purified $CO_2$ stream is withdrawn via line 11 and at least a portion of the purified stream is recycled to the $H_2$ PSA unit 8 via lines 11.1 and 10 where the stream is introduced into the adsorbent beds 19 of the adsorption vessels 18 during the co-purge step in order to increase the concentration of $CO_2$ in the $H_2$ PSA tail gas. A portion 11.2 of purified $CO_2$ stream 11 is optionally compressed to 2000 psig in $CO_2$ Compressor HP Stages 17 and passed on as $CO_2$ product.

By utilizing a purified CO$_2$ stream as a co-purge during the co-purge step of the PSA process cycle, it is possible to obtain a H$_2$ PSA tail gas that contains a considerably higher concentration of CO$_2$.

Elements of the Figures

1—line to provide hydrocarbon stream to reformer unit (reformer feed)
2—line that provides steam
2A—line that provides oxygen
3—steam hydrocarbon reformer unit
3.1—catalyst holding tubes for reformer unit
3A—autothermal reformer unit
4—line that provides reformer product stream to the water gas shift reactor
5—water gas shift reactor
6—line that introduces steam into the water gas shift reactor
7—line that introduces water gas shift effluent into the co-purge hydrogen pressure swing adsorption unit
8—co-purge hydrogen swing adsorption unit
9—line by which high purity hydrogen is withdrawn from the co-purge hydrogen pressure swing adsorption unit
10—line through which the pressure swing adsorption tail gas is withdrawn
10.1—line by which a portion of the hydrogen pressure swing adsorption tail gas is passed to the reformer unit or ATR
10.2—line by which a portion of the hydrogen pressure swing adsorption tail gas is passed to a carbon dioxide compressor (LP stages)
10.3—line by which the compressed carbon dioxide rich hydrogen pressure swing adsorption tail gas is introduced into the carbon dioxide purification unit
11—line by which a purified stream of carbon dioxide is withdrawn from the carbon dioxide purification unit
11.1—line by which the purified stream of carbon dioxide is injected into the hydrogen pressure swing adsorption unit vessel as a co-purge stream
11.2—line by which carbon dioxide product is withdrawn from the from the carbon dioxide purification unit and passed to an optional carbon dioxide compressor (HP stages)
12—carbon dioxide purification unit
13—line from which residue gas is withdrawn from the carbon dioxide purification unit
14—line by which a methane rich stream is withdrawn from the hydrogen pressure swing adsorption unit
15—carbon dioxide compressor (LP stages)
16—line by which gaseous oxygen is introduced into the CO$_2$ purification unit (CatOx unit)
17—Optional CO$_2$ compressor (HP stages)
18—adsorption vessel of the H2 PSA unit
18a—first section of the adsorption vessel (also referred to as lower)
18b—second section of the adsorption vessel (also referred to as upper)
19—adsorbent bed
19.1—first adsorbent bed
19.2—second adsorbent bed
20—internal space of adsorption vessel
21—pipe
22—withdrawal valve
23—means of isolating and separating the adsorbent beds in the upper and lower section of the adsorption vessel
24—intermediate draw area

What is claimed is:

1. A process for recovering gaseous hydrogen and gaseous carbon dioxide from a mixture of hydrocarbons utilizing a reformer unit in conjunction with a pressure swing adsorption unit and a cryogenic purification unit, the process comprising the steps of:

a) generating a hydrogen rich effluent that also contains at least carbon monoxide, carbon dioxide, methane and water vapor from one or more hydrocarbon feed streams in a reformer unit;

b) optionally treating the hydrogen rich effluent in a water gas shift reactor in order to further enrich the hydrogen content of the hydrogen rich effluent and to also increase the carbon dioxide content in the hydrogen rich effluent by oxidizing a portion of the carbon monoxide present in the effluent to carbon dioxide thereby obtaining a water shift effluent;

c) providing a pressure swing adsorption unit having at least two adsorption vessels that each contain two or more adsorbent beds, the at least two adsorption vessels being parallel to one another and being independently operated on a cycle that includes an adsorption step, a co-feed step, a depressurization step, a regeneration step and a re-pressurization step, with the proviso that the cycles in the at least two adsorption vessels run consecutively with at least one of the adsorption vessels being in a different step of the cycle compared to at least one of the remaining adsorption vessels and the two or more adsorbent beds having an intermediate draw area positioned between at least two of the adsorbent beds thereby allowing for the withdrawal of a methane rich gas stream from the intermediate draw area during the co-feed step of the hydrogen pressure swing adsorption cycle;

d) introducing the hydrogen rich effluent or water gas shift effluent into at least one of the adsorption vessels of the pressure swing adsorption unit during the adsorption step of the hydrogen pressure swing adsorption cycle in order to allow for the recovery of a high purity gaseous hydrogen stream from the hydrogen rich effluent or the water gas shift effluent and the adsorption of the carbon monoxide, carbon dioxide, methane, water vapor and remaining hydrogen onto the adsorbents in the adsorbent beds of the pressure swing adsorption unit, the adsorption step being carried out at a pressure from about 250 psig to about 700 psig;

e) withdrawing the high purity gaseous hydrogen stream from the pressure swing adsorption unit during the adsorption step and passing this high purity gaseous hydrogen stream on for further use;

f) allowing the at least one adsorption vessel to enter into the co-feed step while introducing a purified carbon dioxide stream obtained from the downstream cryogenic purification unit in order to allow the carbon dioxide to displace methane and carbon monoxide adsorbed onto the adsorbents in the adsorbent beds thereby producing a methane rich stream;

g) withdrawing the methane rich stream from the intermediate draw area positioned between at least two of the adsorbent beds and recycling this methane rich stream to the reformer unit;

h) allowing the at least one adsorption vessel to enter the depressurization step by depressurizing the adsorbent beds of the at least one adsorption vessel in order to release the carbon dioxide, carbon monoxide, methane, water vapor and hydrogen adsorbed to the adsorbents in the adsorbent beds thereby producing a carbon dioxide rich pressure swing adsorption tail gas having an increased concentration of carbon dioxide;

i) withdrawing the carbon dioxide rich pressure swing adsorption tail gas from the pressure swing adsorption unit;

j) regenerating and re-pressurizing the adsorbent beds for further use;

k) compressing the carbon dioxide rich pressure swing adsorption tail gas in a compressor unit to a pressure that ranges from about 250 psig to about 1000 psig in order to obtain a compressed carbon dioxide rich pressure swing adsorption tail gas;

l) introducing the compressed carbon dioxide rich pressure swing adsorption tail gas into a cryogenic purification unit in order to produce a carbon dioxide purified stream and an incondensibles stream that contains methane, carbon monoxide and hydrogen; and m) withdrawing the carbon dioxide purified stream from the cryogenic purification unit and recycling at least a portion of the carbon dioxide purified stream to the pressure swing adsorption unit where the carbon dioxide purified stream is introduced into the adsorption vessels during the co-feed step of the cycle in order to increase the concentration of carbon dioxide in the hydrogen pressure swing adsorption tail gas.

2. The process of claim 1, wherein the reformer unit is selected from a steam hydrocarbon reformer unit and an oxygen fed autothermal reformer unit.

3. The process of claim 2, wherein the adsorption vessel contains four adsorbent beds with two of the adsorbent beds being adjacent to one another on one side of the intermediate draw area and the remaining two adsorbent beds being positioned on the other side of the intermediate draw area.

4. The process of claim 2, wherein the adsorption vessel comprises a first adsorbent bed that is separated from a second adsorbent bed by the intermediate draw area.

5. The process of claim 4, wherein the first adsorbent bed and the second adsorbent bed each independently comprise one or more adsorbents selected from activated alumina, silica gel, activated carbon, zeolites, and combinations thereof.

6. The process of claim 5, wherein the one or more adsorbents are in layers within the individual adsorbent beds.

7. The process of claim 4, wherein the first adsorbent bed contains one or more adsorbents that are selective for methane and carbon monoxide and the second adsorbent bed contains one or more adsorbents that are selective for carbon dioxide and water vapor.

8. The process of claim 7, wherein the one or more adsorbents are in layers within the individual beds.

9. The process of claim 7, wherein when the hydrogen rich effluent or the water gas shift effluent is introduced into the adsorption vessel during the adsorption step of the hydrogen pressure swing adsorption cycle, the hydrogen rich effluent or the water gas shift effluent comes into contact with the first adsorbent bed before it comes into contact with the second adsorbent bed.

10. The process of claim 2, wherein the carbon dioxide purified stream is introduced into the co-feed step of the pressure swing adsorption cycle at a pressure that is higher than the pressure during the adsorption step of the pressure swing adsorption cycle.

11. The process of claim 10, wherein the pressure during the co-feed step of the pressure swing adsorption cycle is from about 300 psig to about 750 psig.

12. The process of claim 2, wherein the $CO_2$ recovered during the depressurization step of the pressure swing adsorption cycle is collected at two or more different pressure levels utilizing a compressor.

13. The process of claim 12, wherein the pressure levels of the various stages of the carbon dioxide compressor are the same as the pressure levels in the depressurization step of the pressure swing adsorption cycle.

14. The process of claim 1, wherein the portion of the carbon dioxide purified stream obtained from the cryogenic purification unit that is not utilized as a co-feed in the co-feed step of the pressure swing adsorption cycle is further compressed for additional use.

15. A process for recovering gaseous hydrogen and gaseous carbon dioxide from a mixture of hydrocarbons utilizing a reformer unit in conjunction with a pressure swing adsorption unit and a cryogenic purification unit, the process comprising the steps of:

a) generating a hydrogen rich effluent that also contains at least carbon monoxide, carbon dioxide, methane and water vapor from one or more hydrocarbon feed streams in a reformer unit;

b) optionally treating the hydrogen rich effluent in a water gas shift reactor in order to further enrich the hydrogen content of the hydrogen rich effluent and to also increase the carbon dioxide content in the hydrogen rich effluent by oxidizing a portion of the carbon monoxide present in the effluent to carbon dioxide thereby obtaining a water shift effluent;

c) providing a pressure swing adsorption unit having at least two adsorption vessels, each adsorption vessel comprising two sections that are separate from one another and connected by a pipe that allows for the withdrawal of a methane rich gas stream from the pipe during the co-feed step of the hydrogen pressure swing adsorption cycle, each section of the adsorption vessels independently containing two or more adsorbent beds, the at least two adsorption vessels being parallel to one another and being independently operated on a cycle that includes an adsorption step, a co-feed step, a depressurization step, a regeneration step and a re-pressurization step, with the proviso that the cycles in the at least two adsorption vessels run consecutively with at least one of the adsorption vessels being in a different step of the cycle compared to at least one of the remaining adsorption vessels;

d) introducing the hydrogen rich effluent or water gas shift effluent into at least one of the adsorption vessels of the pressure swing adsorption unit during the adsorption step of the hydrogen pressure swing adsorption cycle in order to allow for the recovery of a high purity gaseous hydrogen stream from the hydrogen rich effluent or the water gas shift effluent and the adsorption of the carbon monoxide, carbon dioxide, methane, water vapor and remaining hydrogen onto the adsorbents in the adsorbent beds of the pressure swing adsorption unit, the adsorption step being carried out at a pressure from about 250 psig to about 700 psig;

e) withdrawing the high purity gaseous hydrogen stream from the pressure swing adsorption unit during the adsorption step and passing this high purity gaseous hydrogen stream on for further use;

f) allowing the at least one adsorption vessel to enter into the co-feed step while introducing a purified carbon dioxide stream obtained from the downstream cryogenic purification unit into the lower (second) section, in order to allow the carbon dioxide to displace methane and carbon monoxide adsorbed onto the adsorbents in the adsorbent beds thereby producing a methane rich stream; The upper (first) section is isolated from the lower section.

g) withdrawing the methane rich stream from the pipe positioned between the two sections of the adsorption vessel and recycling this methane rich stream to the reformer unit;

h) allowing the at least one adsorption vessel to enter the depressurization step by depressurizing the adsorbent beds of the at least one adsorption vessel in order to release the carbon dioxide, carbon monoxide, methane, water vapor and hydrogen adsorbed to the adsorbents in the adsorbent beds thereby producing a carbon dioxide rich pressure swing adsorption tail gas having an increased concentration of carbon dioxide;

i) withdrawing the carbon dioxide rich pressure swing adsorption tail gas from the pressure swing adsorption unit;

j) regenerating and re-pressurizing the adsorbent beds for further use;

k) compressing the carbon dioxide rich pressure swing adsorption tail gas in a compressor unit to a pressure that ranges from about 250 psig to about 1000 psig in order to obtain a compressed carbon dioxide rich pressure swing adsorption tail gas;

l) introducing the compressed carbon dioxide rich pressure swing adsorption tail gas into a cryogenic purification unit in order to produce a carbon dioxide purified stream and an incondensibles stream that contains methane, carbon monoxide and hydrogen; and m) withdrawing the carbon dioxide purified stream from the cryogenic purification unit and recycling at least a portion of the carbon dioxide purified stream to the pressure swing adsorption unit where the carbon dioxide purified stream is introduced into the adsorption vessels during the co-feed step of the cycle in order to increase the concentration of carbon dioxide in the pressure swing adsorption tail gas.

16. The process of claim 15, wherein the reformer unit is selected from a steam hydrocarbon reformer unit and an oxygen fed autothermal reformer unit.

17. The process of claim 16, wherein each section of the adsorption vessel comprises two or more adsorbent beds that are adjacent to one another within each section of the adsorption vessel.

18. The process of claim 16, wherein the pipe further contains a first valve which allows for the withdrawing of the methane rich stream between the two sections of the adsorption vessel during the co-feed step of the pressure swing adsorption cycle.

19. The process of claim 18, wherein the pipe further contains a means of isolating the first section of the adsorption vessel from the second section of the adsorption vessel during the withdrawal of the methane rich stream from the pipe through the first valve.

20. The process of claim 19, wherein the means of isolating the first section of the adsorption vessel from the second section of the adsorption vessel comprises a second valve which remains closed during the withdrawal of the methane rich stream from the pipe.

21. The process of claim 15, wherein the first section of the adsorption vessel contains adsorbent beds that include an adsorbent that is selective for methane, carbon monoxide, and nitrogen and the second section of the adsorption vessel contains adsorbent beds that include an adsorbent that allows for the removal of carbon dioxide.

22. The process of claim 21, wherein the pipe that connects the two sections of the adsorption vessel includes a means for isolating the two adsorption vessel sections from one another during the depressurization step of the pressure swing adsorption cycle, thus preventing the methane, carbon monoxide and nitrogen adsorbed to the adsorbent in the first section of the adsorption vessel from mixing with the carbon dioxide adsorbed to the adsorbent of the second section of the adsorption vessel or the carbon dioxide from flowing back into the first section of the adsorption vessel.

23. The process of claim 15, wherein the carbon dioxide purified stream is introduced into the co-feed step of the pressure swing adsorption cycle at a pressure that is higher than the pressure during the adsorption step of the pressure swing adsorption cycle.

24. The process of claim 23, wherein the pressure during the co-feed step of the pressure swing adsorption cycle is from about 300 psig to about 750 psig.

25. The process of claim 15, wherein the carbon dioxide recovered during the depressurization step of the pressure swing adsorption cycle is collected at two or more different pressure levels utilizing a compressor.

26. The process of claim 25, wherein the pressure levels of the various stages of the carbon dioxide compressor are the same as the pressure levels in the depressurization step of the pressure swing adsorption cycle.

27. A process for recovering gaseous hydrogen and gaseous carbon dioxide from a mixture of hydrocarbons utilizing a reformer unit in conjunction with a pressure swing adsorption unit and a catalytic oxidizer unit, the process comprising the steps of:

a) generating a hydrogen rich effluent that also contains at least carbon monoxide, carbon dioxide, methane and water vapor from one or more hydrocarbon feed streams in a reformer unit;

b) optionally treating the hydrogen rich effluent in a water gas shift reactor in order to further enrich the hydrogen content of the hydrogen rich effluent and to also increase the carbon dioxide content in the hydrogen rich effluent by oxidizing a portion of the carbon monoxide present in the effluent to carbon dioxide thereby obtaining a water shift effluent;

c) providing a pressure swing adsorption unit having at least two adsorption vessels that each contain two or more adsorbent beds, the at least two adsorption vessels being parallel to one another and being independently operated on a cycle that includes an adsorption step, a co-feed step, a depressurization step, a regeneration step and a re-pressurization step, with the proviso that the cycles in the at least two adsorption vessels run consecutively with at least one of the adsorption vessels being in a different step of the cycle compared to at least one of the remaining adsorption vessels and the two or more adsorbent beds having an intermediate draw area positioned between at least two of the adsorbent beds thereby allowing for the withdrawal of a methane rich gas stream from the intermediate draw area during the co-feed step of the hydrogen pressure swing adsorption cycle;

d) introducing the hydrogen rich effluent or water gas shift effluent into at least one of the adsorption vessels of the pressure swing adsorption unit during the adsorption step of the hydrogen pressure swing adsorption cycle in order to allow for the recovery of a high purity gaseous hydrogen stream from the hydrogen rich effluent or the water gas shift effluent and the adsorption of the carbon monoxide, carbon dioxide, methane, water vapor and remaining hydrogen onto the adsorbents in the adsorbent beds of the pressure swing adsorption unit, the adsorption step being carried out at a pressure from about 250 psig to about 700 psig;

e) withdrawing the high purity gaseous hydrogen stream from the pressure swing adsorption unit during the adsorption step and passing this high purity gaseous hydrogen stream on for further use;

f) allowing the at least one adsorption vessel to enter into the co-feed step while introducing a purified carbon dioxide stream obtained from the downstream catalytic oxidizer unit in order to allow the carbon dioxide to displace methane and carbon monoxide adsorbed onto the adsorbents in the adsorbent beds thereby producing a methane rich stream;

g) withdrawing the methane rich stream from the intermediate draw area positioned between at least two of the adsorbent beds and recycling this methane rich stream to the reformer unit;

h) allowing the at least one adsorption vessel to enter the depressurization step by depressurizing the adsorbent beds of the at least one adsorption vessel in order to release the carbon dioxide, carbon monoxide, methane, water vapor and hydrogen adsorbed to the adsorbents in the adsorbent beds thereby producing a carbon dioxide rich pressure swing adsorption tail gas having an increased concentration of carbon dioxide;

i) withdrawing the carbon dioxide rich pressure swing adsorption tail gas from the pressure swing adsorption unit;

j) regenerating and re-pressurizing the adsorbent beds for further use;

k) compressing the carbon dioxide rich pressure swing adsorption tail gas in a compressor unit to a pressure that ranges from about 250 psig to about 1000 psig in order to obtain a compressed carbon dioxide rich pressure swing adsorption tail gas;

l) introducing the compressed carbon dioxide rich pressure swing adsorption tail gas into the catalytic oxidizer unit followed by introducing gaseous oxygen thereby allowing for the carbon monoxide, methane, and hydrogen to be combusted to produce an oxidized stream that contains carbon dioxide and water, the amount of oxygen being introduced being slightly below the stoichiometric requirement;

m) condensing the oxidized stream to allow for the removal of water by cooling the oxidized stream to ambient temperature to produce a carbon dioxide purified stream; and n) withdrawing the carbon dioxide purified stream from the catalytic oxidizer unit and recycling at least a portion of the carbon dioxide purified stream to the pressure swing adsorption unit where the carbon dioxide purified stream is introduced into the adsorption vessels during the co-feed step of the cycle in order to increase the concentration of carbon dioxide in the hydrogen pressure swing adsorption tail gas.

28. The process of claim 27, wherein the reformer unit is selected from a steam hydrocarbon reformer unit and an oxygen fed autothermal reformer unit.

29. The process of claim 28, wherein the adsorption vessel contains four adsorbent beds with two of the adsorbent beds being adjacent to one another on one side of the intermediate draw area and the remaining two adsorbent beds being positioned on the other side of the intermediate draw area.

30. The process of claim 28, wherein the adsorption vessel comprises a first adsorbent bed that is separated from a second adsorbent bed by the intermediate draw area.

31. The process of claim 30, wherein the first adsorbent bed and the second adsorbent bed each independently comprises one or more adsorbents selected from activated alumina, silica gel, activated carbon, zeolites, and combinations thereof.

32. The process of claim 31, wherein the one or more adsorbents are in layers within the individual adsorbent beds.

33. The process of claim 30, wherein the first adsorbent bed contains one or more adsorbents that are selective for methane and carbon monoxide and the second adsorbent bed contains one or more adsorbents that are selective for carbon dioxide and water vapor.

34. The process of claim 33, wherein the one or more adsorbents are in layers within the individual beds.

35. The process of claim 33, wherein when the hydrogen rich effluent or the water gas shift effluent is introduced into the adsorption vessel during the adsorption step of the hydrogen pressure swing adsorption cycle, the hydrogen rich effluent or the water gas shift effluent comes into contact with the first adsorbent bed before it comes into contact with the second adsorbent bed.

36. The process of claim 28, wherein the carbon dioxide purified stream is introduced into the co-feed step of the pressure swing adsorption cycle at a pressure that is higher than the pressure during the adsorption step of the pressure swing adsorption cycle.

37. The process of claim 36, wherein the pressure during the co-feed step of the pressure swing adsorption cycle is from about 300 psig to about 750 psig.

38. The process of claim 28, wherein the $CO_2$ recovered during the depressurization step of the pressure swing adsorption cycle is collected at two or more different pressure levels utilizing a compressor.

39. The process of claim 38, wherein the pressure levels of the various stages of the carbon dioxide compressor are the same as the pressure levels in the depressurization step of the pressure swing adsorption cycle.

40. The process of claim 27, wherein the portion of the carbon dioxide purified stream obtained from the cryogenic purification unit that is not utilized as a co-feed in the co-feed step of the pressure swing adsorption cycle is further compressed for additional use.

41. A process for recovering gaseous hydrogen and gaseous carbon dioxide from a mixture of hydrocarbons utilizing a reformer unit in conjunction with a pressure swing adsorption unit and a catalytic oxidizer unit, the process comprising the steps of:

a) generating a hydrogen rich effluent that also contains at least carbon monoxide, carbon dioxide, methane and water vapor from one or more hydrocarbon feed streams in a reformer unit;

b) optionally treating the hydrogen rich effluent in a water gas shift reactor in order to further enrich the hydrogen content of the hydrogen rich effluent and to also increase the carbon dioxide content in the hydrogen rich effluent by oxidizing a portion of the carbon monoxide present in the effluent to carbon dioxide thereby obtaining a water shift effluent;

c) providing a pressure swing adsorption unit having at least two adsorption vessels, each adsorption vessel comprising two sections that are separate from one another and connected by a pipe that allows for the withdrawal of a methane rich gas stream from the pipe during the co-feed step of the hydrogen pressure swing adsorption cycle, each section of the adsorption vessels independently containing two or more adsorbent beds, the at least two adsorption vessels being parallel to one another and being independently operated on a cycle that includes an adsorption step, a co-feed step, a depressurization step, a regeneration step and a re-pressurization step, with the proviso that the cycles in the at least two adsorption vessels run consecutively with at least one of the adsorption vessels being in a different step of the cycle compared to at least one of the remaining adsorption vessels;

d) introducing the hydrogen rich effluent or water gas shift effluent into at least one of the adsorption vessels of the pressure swing adsorption unit during the adsorption step of the hydrogen pressure swing adsorption cycle in order to allow for the recovery of a high purity gaseous hydrogen stream from the hydrogen rich effluent or the water gas shift effluent and the adsorption of the carbon monoxide, carbon dioxide, methane, water vapor and remaining hydrogen onto the adsorbents in the adsorbent beds of the pressure swing adsorption unit, the adsorption step being carried out at a pressure from about 250 psig to about 700 psig;

e) withdrawing the high purity gaseous hydrogen stream from the pressure swing adsorption unit during the adsorption step and passing this high purity gaseous hydrogen stream on for further use;

f) allowing the at least one adsorption vessel to enter into the co-feed step while introducing a purified carbon dioxide stream obtained from the downstream catalytic oxidizer unit into the lower (second) section, in order to allow the carbon dioxide to displace methane and carbon monoxide adsorbed onto the adsorbents in the adsorbent beds thereby producing a methane rich stream;

g) withdrawing the methane rich stream from the pipe positioned between the two sections of the adsorption vessel and recycling this methane rich stream to the reformer unit;

h) allowing the at least one adsorption vessel to enter the depressurization step by depressurizing the adsorbent beds of the at least one adsorption vessel in order to release the carbon dioxide, carbon monoxide, methane, water vapor and hydrogen adsorbed to the adsorbents in the adsorbent beds thereby producing a carbon dioxide rich pressure swing adsorption tail gas having an increased concentration of carbon dioxide;

i) withdrawing the carbon dioxide rich pressure swing adsorption tail gas from the pressure swing adsorption unit;

j) regenerating and re-pressurizing the adsorbent beds for further use;

k) compressing the carbon dioxide rich pressure swing adsorption tail gas in a compressor unit to a pressure that ranges from about 250 psig to about 1000 psig in order to obtain a compressed carbon dioxide rich pressure swing adsorption tail gas;

l) introducing the compressed carbon dioxide rich pressure swing adsorption tail gas into a catalytic oxidizer unit followed by introducing gaseous oxygen thereby allowing for the carbon monoxide, methane, and hydrogen to be combusted to produce an oxidized stream that contains carbon dioxide and water, the amount of oxygen being introduced being slightly below the stoichiometric requirement;

m) condensing the oxidized stream to allow for the removal of water by cooling the oxidized stream to ambient temperature to produce a carbon dioxide purified stream; and n) withdrawing the carbon dioxide purified stream from the catalytic oxidizer unit and recycling at least a portion of the carbon dioxide purified stream to the pressure swing adsorption unit where the carbon dioxide purified stream is introduced into the adsorption vessels during the co-feed step of the cycle in order to increase the concentration of carbon dioxide in the pressure swing adsorption tail gas.

42. The process of claim 41, wherein the reformer unit is selected from a steam hydrocarbon reformer unit and an oxygen fed autothermal reformer unit.

43. The process of claim 42, wherein each section of the adsorption vessel comprises two or more adsorbent beds that are adjacent to one another within each section of the adsorption vessel.

44. The process of claim 42, wherein the pipe further contains a first valve which allows for the withdrawing of the methane rich stream between the two sections of the adsorption vessel during the co-feed step of the pressure swing adsorption cycle.

45. The process of claim 44, wherein the pipe further contains a means of isolating the first section of the adsorption vessel from the second section of the adsorption vessel during the withdrawal of the methane rich stream from the pipe through the first valve.

46. The process of claim 45, wherein the means of isolating the first section of the adsorption vessel from the second section of the adsorption vessel comprises a second valve which remains closed during the withdrawal of the methane rich stream from the pipe.

47. The process of claim 41, wherein the first section of the adsorption vessel contains adsorbent beds that include an adsorbent that is selective for methane, carbon monoxide, and nitrogen and the second section of the adsorption vessel contains adsorbent beds that include an adsorbent that allows for the removal of carbon dioxide.

48. The process of claim 47, wherein the pipe that connects the two sections of the adsorption vessel includes a means for isolating the two adsorption vessel sections from one another during the depressurization step of the pressure swing adsorption cycle, thus preventing the methane, carbon monoxide and nitrogen adsorbed to the adsorbent in the first section of the adsorption vessel from mixing with the carbon dioxide adsorbed to the adsorbent of the second section of the adsorption vessel or the carbon dioxide from flowing back into the first section of the adsorption vessel.

49. The process of claim 41, wherein the carbon dioxide purified stream is introduced into the co-feed step of the pressure swing adsorption cycle at a pressure that is higher than the pressure during the adsorption step of the pressure swing adsorption cycle.

50. The process of claim 49, wherein the pressure during the co-feed step of the pressure swing adsorption cycle is from about 300 psig to about 750 psig.

51. The process of claim 41, wherein the carbon dioxide recovered during the depressurization step of the pressure swing adsorption cycle is collected at two or more different pressure levels utilizing a compressor.

52. The process of claim 51, wherein the pressure levels of the various stages of the carbon dioxide compressor are the same as the pressure levels in the depressurization step of the pressure swing adsorption cycle.

* * * * *